United States Patent [19]

Greenberg

[11] 3,898,906

[45] Aug. 12, 1975

[54] STRADDLE FASTENING DEVICE
[76] Inventor: Gerald H. Greenberg, 8301 S.W. 27th Ter., Miami, Fla. 33155
[22] Filed: Jan. 16, 1974
[21] Appl. No.: 433,852

[52] U.S. Cl. .................................................. 85/11
[51] Int. Cl.² ....................................... F16B 15/00
[58] Field of Search ............... 85/11, 138; 52/753 D

[56] References Cited
UNITED STATES PATENTS
2,596,181  5/1952  Soderberg et al. ...................... 85/11
3,266,361  8/1966  Gravenhorst et al. .................. 85/11

FOREIGN PATENTS OR APPLICATIONS
276,567  8/1930  Italy ....................................... 85/11

Primary Examiner—Edward C. Allen

[57] ABSTRACT

A fastening device of preferably spring steel for securing abutting members having a rectangular shaped body portion with leg portions extending at right angle at the leading edge and at an acute angle at the trailing edge. The leading edges of the body and leg portions having V-shaped notches with sharpened edge portions whereby upon forcing the fastening device into the abutting members, the body and leg portions cut a slot along which the fastener slides with the leg portions yieldingly forcing the abutting members in a direction toward each other.

2 Claims, 10 Drawing Figures

PATENTED AUG 12 1975

3,898,906

STRADDLE FASTENING DEVICE

BACKGROUND OF THE INVENTION

1. Field of the Invention.

This invention relates to fasteners and is more particularly directed to a fastening device for securing together a pair of members in abutting relationship.

2. Description of the Prior Art.

The present wood fasteners for retaining a pair of wood members in abutting relation such as picture frames and the like consist of a flat body portion with leg portion extending at right angle whose leading edges are notched and sharpened and extending at an angle other than parallel with each other so that as the fastener is hammered into place, there is a tendency for the two members to be drawn together. However, due to the fact that the leg portions are not parallel with each other, the trailing edge of the leg portions are not received by the slot formed by the leading edge so that it has been found difficult to hammer thoese fasteners in the abutting members, requiring excessive force to drive the fasteners completely into the members. Oftimes, the fastener becomes mutilated during the hammering process and at other times times unsightly notches or openings are formed in the wood caused by the leg portions entering the wood at an angle not coplanar with the direction of travel of the leg portions.

The present invention contemplates avoiding the above indicated objections to the present fasteners for joining abutting members together.

SUMMARY OF THE INVENTION

Therefore, a principal object of the present invention is to provide a straddle fastening device for securing two abutting members by having leg portions that are tensioned to draw the two abutting members in a direction toward each other.

Another object of the present invention is to provide a fastening device having a rectangular shaped body member with leg portions extending at right angle thereto at the leading edge and at an acute angle at the trailing edge so that upon the fastener being driven into a pair of abutting wood members the straightening effect of trailing edges of the leg portions tend to force the members together.

A further object of the present invention is to provide a wood fastening device for securing two members in abutting relation with means for readily removing the fastener from the members without defacing or destroying the wood members.

A still further object of the present invention is to provide a metal fastening device for abutting wood members with an opening struck from its body portion, which opening assists in the removal of the fastener, if desired and the metal of struck portion forms a shoulder engaging the fibers of the wood members to thereby assist in retaining the fastener in position.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DESCRIPTION OF THE PREFERRED EMBODIMENTS

Figure 5:
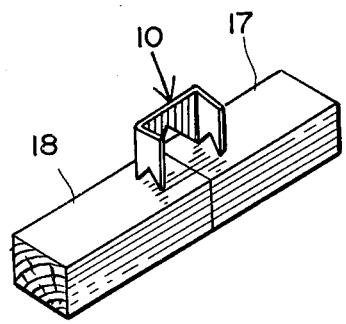
FIGS. 5–8 inclusive are perspective views of various arrangements of abutting wood members being joined together by my fastener.
Figure 6:
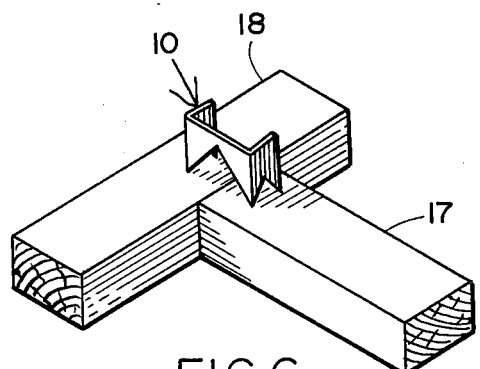
Figure 7:
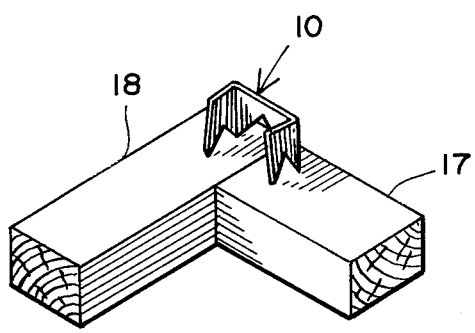
Figure 8:
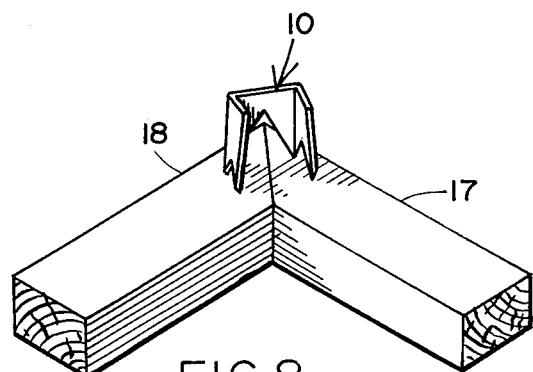
Figure 1:
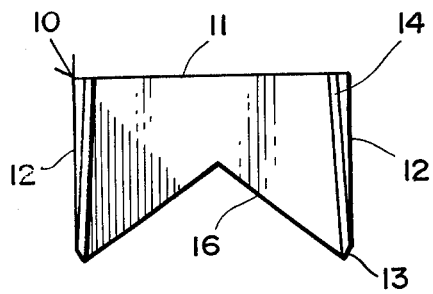
FIGS. 1 and 2 are front and rear elevational views of a fastening device constructed in accordance with my invention.
Figure 3:
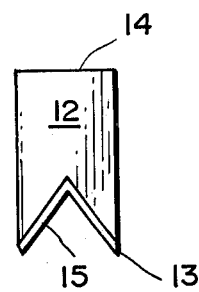
FIGS. 3 and 4 are side elevational and top plan views respectively.
Figure 2:
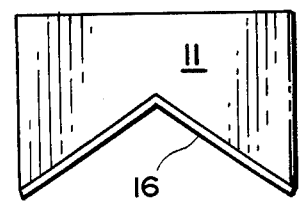
Figure 4:
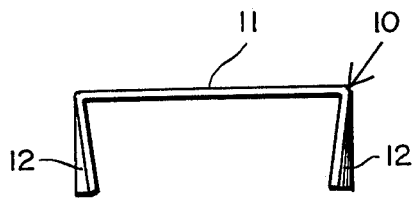

Referring to the drawing wherein like numerals are used to designate similar parts throughout the several views, the numeral 10 refers to my straddle type fastener which consists of a flat body portion 11 made of preferably spring steel and rectangular in shape. Along each edge portion of the body portion 11 extends flat leg portions 12. The leading edge 13 of the leg portions 12 extend at exactly right angle with the body portion 12 while the trailing edge 14 extends at a few degrees less than right angle with the body portion 11 as best shown by FIG. 3. The leading edges of the leg portions 12 are provided with a V-notch 15 and sharpened to penetrate wood or plastic while the leading edge of the body portion 11 is provided with a V-notch 16 with a knife-like sharpened edge formed along the notch 16.

In the normal use of my straddle-type fastening device 10 to join two abutting pieces of wood 17 and 18 in various abutting relation as shown by FIGS. 5 to 8 inclusive, the fastener 10 is placed to span the juncture of the two pieces of wood 17 and 18 with the sharpened leading edges 13 in contact relation with the wood. The trailing edges 14 are now struck by a hammer to force the sharpened and notched edges 15 and 16 to cut a U-shaped slot in the wood as the remainder of the fastener 10 slides along the slot thus formed until the fastener 10 is completely imbedded. It is to be noted that since the body portion 11 is rectangular in shape and the leg portions 12 at the leading edges 13 are at right angle thereto, the slot formed in the wood will be thusly shaped and as the fastener 10 is made to penetrate into the wood, the inwardly bent portion of the trailing edges 14 of the leg portions 12 will be forced outwardly as they enter along the cut slot in wood thereby exerting a constant tension or force that tends to align the trailing edges 14 of the leg portions 12 with those of the leading edges 13. This force being applied by the leg portions 12 in a direction toward each other compels the wood pieces 17 and 18 to abut tightly together and since spring steel will not take a set, the abutting force stays in effect as long as the fastener 10 remains in place. My fasteners 10 are most effective for use in all types of butts as indicated by the end to end butt by FIG. 5, plain butt by FIG. 6, corner butt by FIG. 7 and mitered butt by FIG. 8. In all of these butt structures, my fastener 10 spanning the juncture of the wood pieces will exert a constant force which compels the wood members in a direction toward each other.

Figure 9:
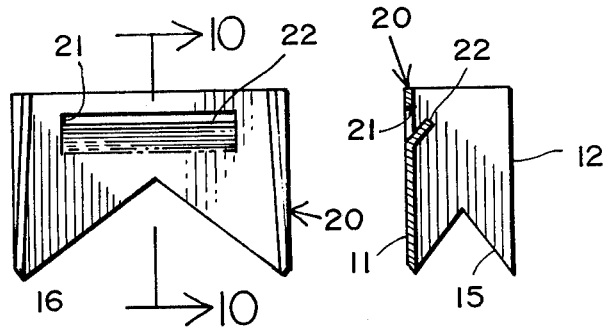
FIG. 9 is a front elevational view of another embodiment of the present invention.
Figure 10:
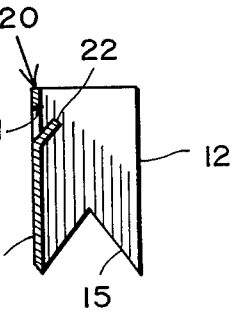
FIG. 10 is a cross sectional view taken along the line 10—10 of FIG. 9.

In my alternate embodiment shown by FIGS. 9 and 10, I provide a fastener 20 that provides means for retaining the fastener 20 more securely in its fastening position and also to permit the ready removal, if desired. The fastener 20 is identical in structure with that of the fastener 10 as described hereinabove except that a slot 21 is formed in the body portion 11. The slot 21 is formed by punch process which cuts the slot 21 along 3 sides and on its lower edge portion bends the metal to form a lip portion 22. The slot 21 provides a dual function, first to permit the entrance of a pointed tool such as an ice pick to remove the fastener 20 when it is desired to disengage two abutting pieces of wood, and also to secure the fastener 20 securely in place. The lip portion 22 bites into the wood adjacent the slot in which the fastener is positioned to assist in preventing the outward sliding movement of the fastener 20. Also, the ends of the fibers of the wood will extend into the opening 21 to further prevent the inadvertent removal of the fastener 20.

Having disclosed my invention, what I claim as new and desire to secure by Letters Patent of the United States is:

1. A straddle fastening device for joining abutting wood members and the like comprising a substantially rectangularly shaped body member having side edge portions, leg members extending along said side edge portions, said body member and said leg members having a leading edge portion and a trailing edge portion, said leading edge portions extending at substantially right angle from said body member and said trailing edge portions extending at substantially an acute angle with said body member, substantially V-shaped notches formed in leading edges of said body member and said leg members, said notches having sharpened edge portions for cutting into said abutting wood members and forming a substantially U-shaped slot for receiving said fastening device, a free end of said trailing edge portions of said leg members being out of coplanar relation with said leading edge portions and extending in a direction toward each other, said leg members being substantially equally spaced at their junction with said body member for providing a substantially vertical disposition for said juncture, whereby said fastening device is received in said slot formed in said wood member and said free ends of said trailing edge portions exert a yieldingly force in said slot directing the abutting members in a direction toward each other.

2. The structure as recited by claim 1 taken in combination with an opening in said body member above said notch formed by striking said body member and a shoulder extending along said opening out of coplanar relation with said body member for engaging said wood member and retaining said fastener in said slot.

* * * * *